Oct. 21, 1958 R. V. JUDY 2,857,472

CALL-DISTRIBUTING TELEPHONE SYSTEM

Filed May 14, 1954 4 Sheets-Sheet 1

Oct. 21, 1958 R. V. JUDY 2,857,472

CALL-DISTRIBUTING TELEPHONE SYSTEM

Filed May 14, 1954 4 Sheets-Sheet 2

Oct. 21, 1958 R. V. JUDY 2,857,472

CALL-DISTRIBUTING TELEPHONE SYSTEM

Filed May 14, 1954 4 Sheets-Sheet 3

CALL-DISTRIBUTING TELEPHONE SYSTEM

Filed May 14, 1954 4 Sheets-Sheet 4

United States Patent Office 2,857,472

Patented Oct. 21, 1958

2,857,472

CALL-DISTRIBUTING TELEPHONE SYSTEM

Robert V. Judy, Chicago, Ill., assignor to International Telephone and Telegraph Corporation, a corporation of Maryland Application May 14, 1954, Serial No. 429,861

10 Claims. (Cl. 179—27)

This invention relates to a call-distributing telephone system. The general object is to provide a new and improved system for distributing to idle attended special-service operator positions the calls received on a group of special-service trunks.

Important features are that calls waiting on the special-service trunks are answered in the order of their arrival thereon, and that such waiting calls are distributed sequentially to such of the attended special-service positions as are idle.

GENERAL DESCRIPTION

It has been chosen to illustrate the invention as embodied in an automatic telephone system wherein a group of special-service trunks are accessible upon the calling of a special-service number assigned thereto, and wherein a group of special-service operator positions are assigned to answering calls over the special-service trunks. It may be assumed that the special service given over the noted trunks and positions is information service, which is used by those desiring to learn the telephone numbers of persons not yet listed in the directory, or of persons not listed in the local directory.

According to one feature of the invention, preference-allotting apparatus is provided which defines a series of preference positions according to which waiting calls are answered in sequence, and preference-selecting apparatus is provided which assigns the unoccupied preference positions to the trunks in succession as the calls arrive thereon, any such trunk thereby having the lowest-numbered unoccupied preference position assigned thereto.

According to another feature, position-allotting apparatus is provided which defines an endless-chain order of succession to the operator positions and tests the positions in that order to select an idle one when any waiting call is to be answered, and switching apparatus is provided to connect any such selected position to the trunk on which the oldest unanswered call is waiting, as determined by the next preference position in the series.

Another feature is that the foregoing allotting, selecting, and switching operations occur automatically, responsive to seizure of the special-service trunks through the automatic switches, whereby the connections are extended telephonically to the respective positions without requiring the operators to perform any special acts.

A further feature is that the operator who has answered a call and has completed the concerned transaction can cause the connection to the special-service trunk and to her position to be released forthwith, by the operation of a release key, without waiting for the calling person to clear out the connection.

According to a still further feature, any operator may cause any call she is handling to be transferred, by operating a transfer key which causes the concerned call to appear at an idle one of a group of similarly equipped supervisory positions. Upon the call being answered at a supervisory position, it is automatically cleared from the original answering position. This feature is of special utility when information is requested in a language with which the answering operator is not familiar but which may be familiar to the supervisory operators.

Other objects and features will appear hereinafter.

Of the accompanying drawings, comprising Figs. 1 to 4, Figs. 1 to 3 illustrate one embodiment, and Fig. 4 illustrates a desirable modification.

DETAILED DESCRIPTION

The invention having been described generally, a detailed description will now be given.

Figure 1:
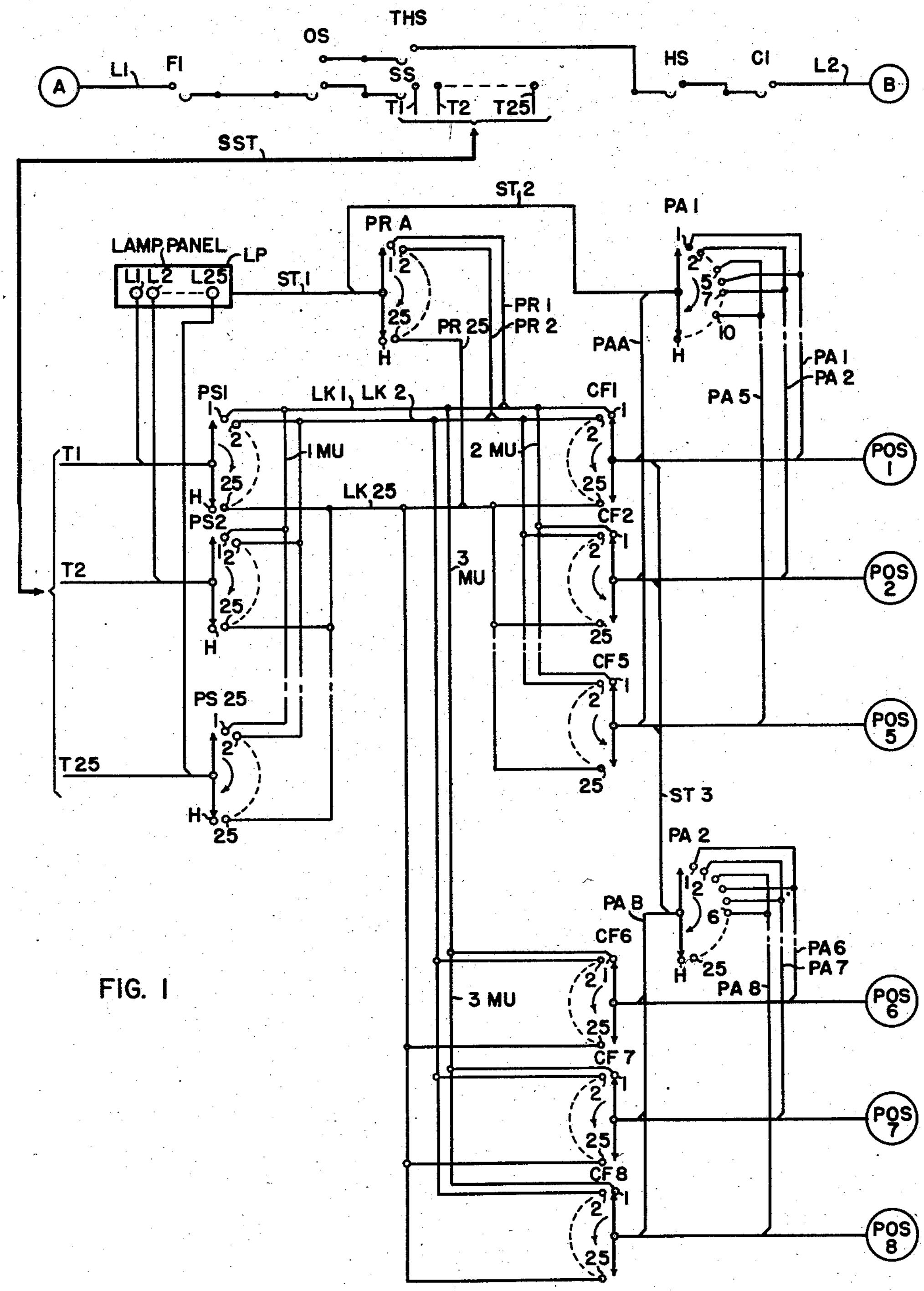
Fig. 1 is a schematic single-line switching diagram of an automatic telephone switching system embodying the invention.

*Fig. 1—trunking diagram*

Referring now to Fig. 1 of the drawings, a simplified single-line switching diagram of an automatic telephone switching system is shown in order to more clearly set forth the invention.

The upper portion of Fig. 1 illustrates, schematically, a telephone switching system of the well-known step-by-step type.

If, for example, the subscriber at A desires to call the subscriber at B, he lifts his handset (not shown), listens for dial tone, and dials the number of station B. A connection from line L1 is thereby completed which may include finder F1, office selector OS, thousands selector THS, hundreds selector HS, connector C1, to line L2. Each of the items F1, OS, THS, HS, and C1 constitutes but one of a group of equivalent items, according to the usual telephone-system practice. Finder F1, being idle and allotted, finds the calling line L1 and connects it to OS, whereat dial tone is returned in the usual manner. When the office digit (5 for example) assigned to the local office is dialed, selector OS selects the corresponding level and selects an idle trunk therein, such as the trunk to selector THS. When the thousands digit is dialed, selector THS similarly selects an idle hundreds selector, such as HS. When the hundreds digit is dialed, selector HS selects the corresponding hundreds group and selects an idle connector therein, such as C1. When the tens and units digits are dialed, connector C1 selects the corresponding tens group and selects the called line L2 therein, followed by the called line being rung until answering occurs. The connection clears out when the handsets are replaced.

In the system of Fig. 1, special services are handled through a group of special second selectors exemplified by second selector SS. These selectors are reached from the first level of the office selectors OS. One of the levels of the special second selectors SS is used for a group of information trunks SST. As illustrated, there are twenty-five such trunks, T1 to T25, which extend respectively to preference selectors PS1 to PS25 which comprise a portion of the call-distributing arrangement with which the invention deals. The selectors SS may comprise groups of selectors having the level in question graded in the usual manner to provide the illustrated 25-trunk group SST.

Each of the switches PS1 to PS25 may be of the usual multi-brush rotary stepping magnet-driven type. Each is illustrated as having a home position and twenty-five selecting positions, being thus a 25-point homing switch. The switches PS1 to PS25 have common access to links LK1 to LK25 over which the information calls pass. Each switch PS1 to PS25 normally stands in its home position H, from which position it is advanced when a call arrives on the associated trunk T1 to T25. Any such switch searches over the links LK1 to LK25 in sequence to find the lowest-numbered idle one, whereby the position of preference of the corresponding call is established.

Preference allotter PRA is a 25-point homing switch having access to links LK1 to LK25. Its purpose is to allot and mark these links in sequence so as to cause the call finders CF1 to CF5 to connect with the unanswered ones of the links in regular order. During non-waiting intervals, PRA stands in its home position H, from which it is advanced, by the arrival of a call, to search for the lowest-numbered link LK1 to LK25, whereat PRA stops; marks that link; and waits thereon until the call on the marked link is answered.

Five operator positions POS1 to POS5 are provided for answering the calls on LK1 to LK25, being provided with call-finder switches CF1 to CF5 for this purpose. Switches CF1 to CF5 have common access to links LK1 to LK25, and they may be similar to switches PS1 to PS25, but do not require a home position.

Position allotter PA1 has access to positions POS1 to POS5 in regular order, and is used to allot idle ones of them in regular sequence. The call-finder CF1 to CF5 at the currently allotted position is thereby started to find any link LK1 to LK25 which has been allotted by preference allotter PRA.

Lamp panel LP is provided with lamps L1 to L25 which show unanswered calls on trunks T1 to T25 respectively. These lamps enable a supervisory operator to decide at any time whether an efficient number of the positions POS1 to POS5 are attended.

The apparatus at the lower portion of Fig. 1 is supervisory apparatus enabling selected calls received at the first five positions to be transferred to and handled at three supervisory position POS6 to POS8. Position allotter PA2 may be similar to PA1, and switches CF6 to CF8 may be similar to CF1 to CF5.

*General operation*

If the subscriber at A, for example, desires information service, he dials the assigned information number, such as 14. If the finder and office selector F1 and OS1 are used, OS1 responds to the digit 1 to select an idle selector SS, and selector SS responds to the digit 4 to select an idle information trunk in group SST, such as T1.

Lamp L1 on the lamp panel LP is thereupon lighted. Preference-selector PS1 now advances from its home position and stops on the first idle link, such as LK1, and marks that link in the bank of preference allotter PRA.

Current drawn by lamp panel LP causes start wire ST1 to become energized. Allotter PRA is thereby started from its home position (or its action is thereby continued if it is in a non-home position) to advance over its sets of preference conductors PR1 to PR25 in search of the first link LK1 to LK25 having an unanswered call thereon. In the assumed example that link is LK1. PRA stops thereon; marks LK1 busy to the other switches PS2 to PS25, marks link LK1 as waiting in the bank of call-finders CF1 to CF5; energizes start wire ST2; and waits until the marked link LK1 is found (and the call thereon answered) by CF1 to CF5 in response to the energization of ST2. When a waiting link is found by a finder CF1 to CF5, its condition is changed from waiting to answered, wherefore the preference allotter PRA will not again allot it, but the answered link is held busy to switches PS1 to PS25 until the connection thereover is released.

If the first position POS1 is currently allotted, by PA1 being in position 1, the call on link LK1 is found by CF1 extending the connection to POS1.

When the call on trunk T1 is thus answered, lamp L1, of lamp panel LP is extinguished, and the marking of link LK1 in the bank of PRA is canceled. If no other calls are waiting the preference allotter PRA is returned to home position. Otherwise, the energization of ST1 is continued to cause allotter PRA to find and allot the next waiting link LK2 to LK25.

If a number of calls arrive over the trunks T1 to T25 within a short interval, the concerned switches PS1 to PS25 place them on idle ones of the links LK1 to LK25 in regular order.

Figure 2:
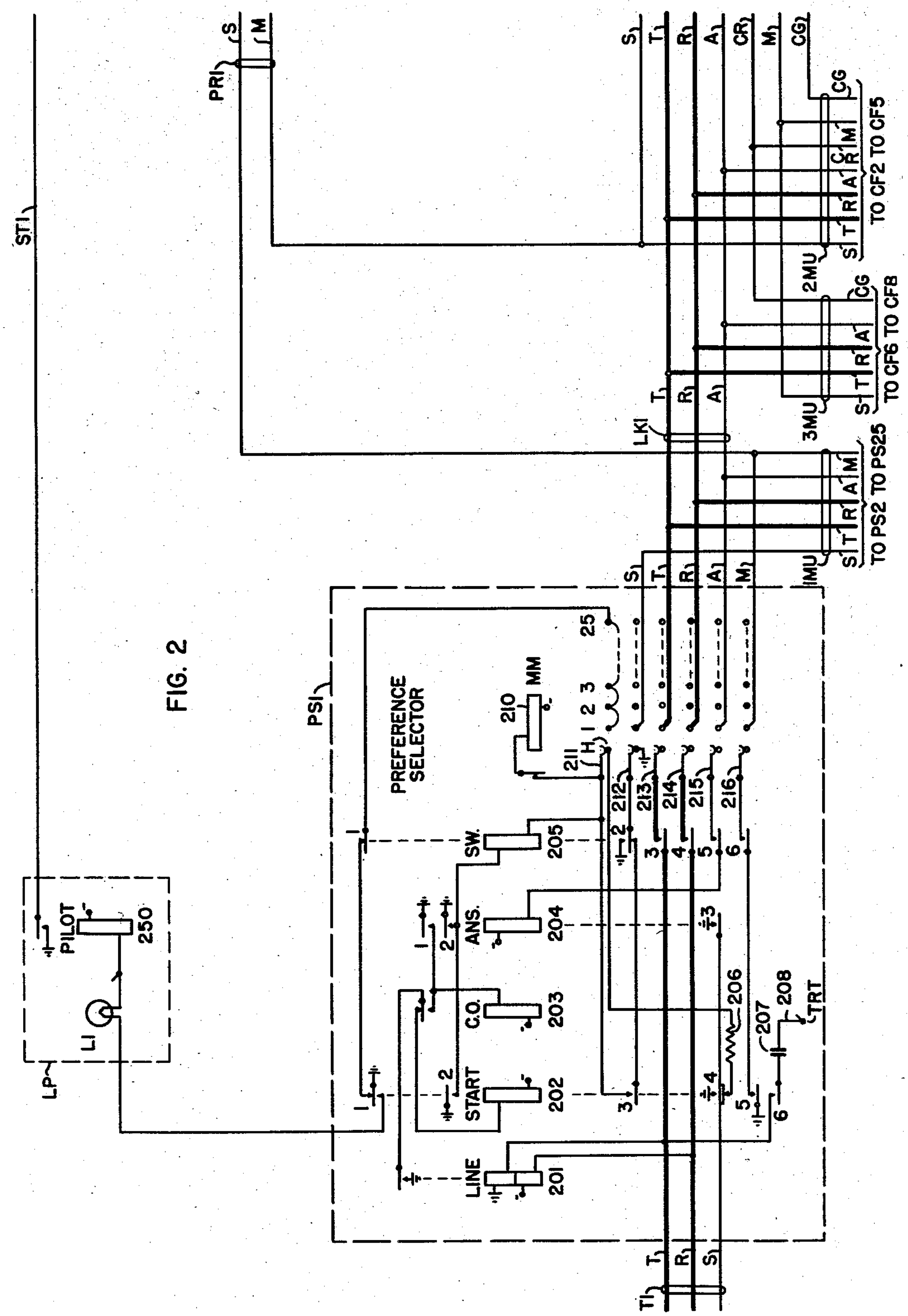
Figs. 2 and 3 are circuit diagrams of portions of the apparatus of Fig. 1.
Figure 3:
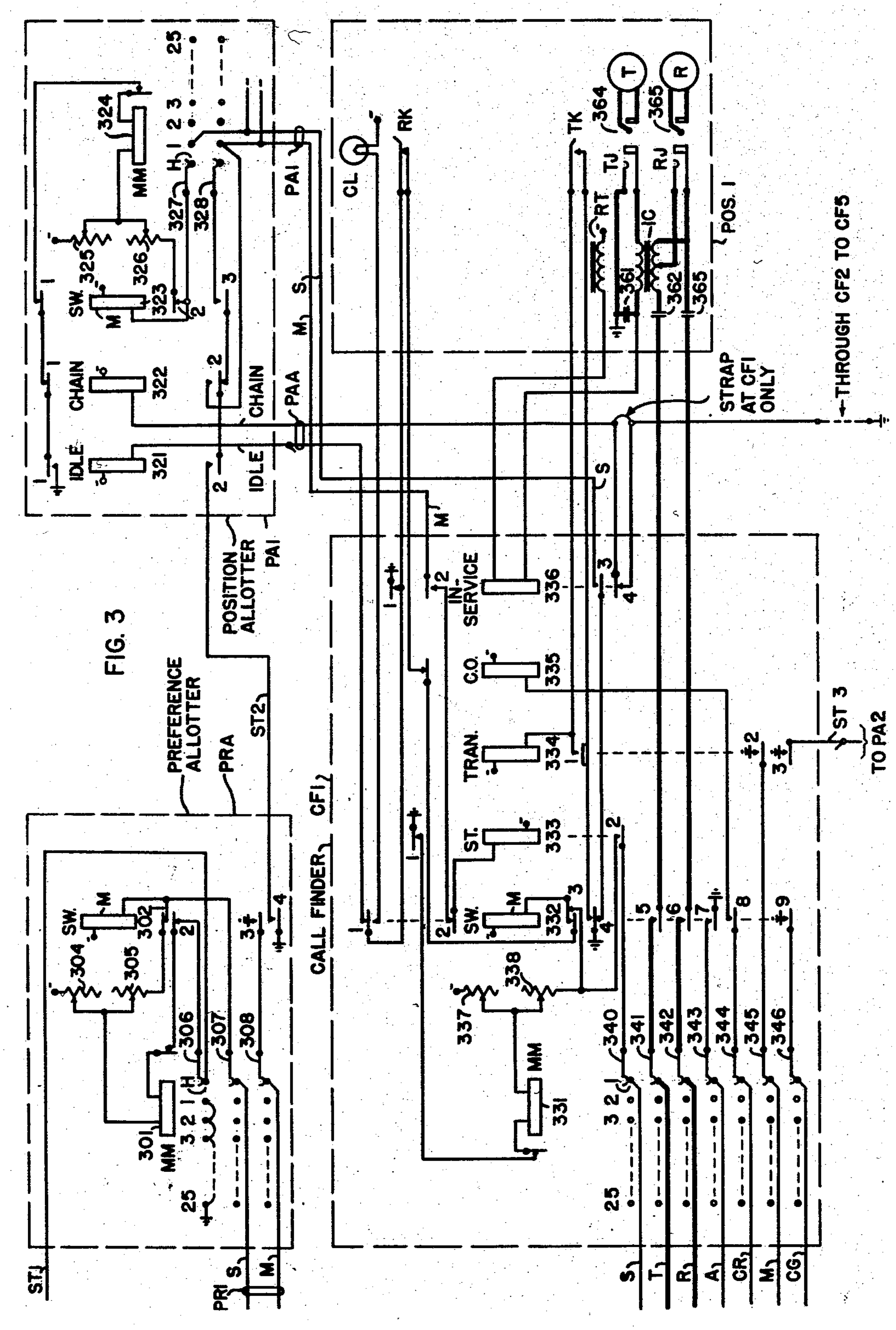

*Figs. 2 and 3—circuit diagram*

Figs. 2 and 3 are illustrating circuit diagrams of apparatus of Fig. 1, comprising lamp panel LP, preference allotter PRA, position allotter PA1, trunk T1, preference selector PS1, link LK1, call finder CF1, and the apparatus at operators position POS1. The other trunks, preference selectors, links, finders, and position equipments of Fig. 1 may be similar to the respective illustrated examples. Fig. 2 also shows the respective wires in multiples 1MU, 2MU, and 3MU of Fig. 1: Conductors 1MU are the link-1 multiple in the banks of selector PS1 to PS25; conductors 2MU are the link-1 multiple in the banks of finders CF1 to CF5, and conductors 3MU are the link-1 multiple in the banks of finders CF6 to CF8.

Referring to position POS1, with that position attended, plugs 364 and 365 are in jacks TJ and RJ, respectively, to connect the operator's transmitter T and a receiver R in the circuit. Then the in-service relay 336 stands operated from ground at transmitter jack TJ, through transmitter T, one winding of induction coil IC, winding of relay 336, and through retard coil RT to battery. By-pass condenser 361 cooperates with RT and 336 for the usual filtering purpose.

At its contacts 2, relay 336 prepares an operate circuit for start relay 333; at its contacts 3, it normally places an idle marking ground on wire S in the bank of position allotter PA1; and at its contacts 1, it grounds wire Idle in group PAA through back contacts 1 of switching relay 332, thereby operating idle relay 321 of PA1. Wire Idle is common to all call finders CF1 to CF5, as indicated, wherefore it is grounded to hold relay 321 operated when any position POS1 to POS5 is attended and idle. Chain relay 322 is restored at any time when any position POS2 to POS5 is attended, as its circuit is opened at contacts 4 of the relay 336 associated with that position. Contacts 4 of the illustrated relay 336 are strapped to prevent that relay from restoring relay 322, wherefore relay 322 is operated except when one of the succeeding positions is attended.

*Detailed operation*

When preference selector PS1 is not in use and is in its illustrated normal (home) position, an idle-indicating battery potential is applied to sleeve conductor S of trunk T1, by way of motor magnet 210, homing brush 211 and its homing contact H, resistor 206, and back contact 4 of relay 202. The trunk T1 is thereby indicated as idle to the selectors SS of Fig. 1.

When a call arrives on trunk T1, by the seizure of that trunk by a selector SS of Fig. 1, line relay 201 operates over the calling loop and conductors T and R of T1. It operates start relay 202 through the back contact of cut-off relay 203. At its contacts 5, start relay 202 prepares to apply marking ground to brush 216; at its contacts 4, it substitutes a holding ground potential on wire S of T1 for the normal idle-indicating battery potential; at its contacts 6, it applies trunk-ring-tone current to wire T of trunk T1, from source TRT, via wire 208 and condenser 207; at its back contacts 1, it disconnects ground from contacts 1 to 25 in the bank of homing brush 211; at its front contact 1, it lights lamp L1 of lamp panel LP in series with pilot relay 205. At its contacts 3, relay 202 connects motor magnet 210 to test brush 212 via back contact 2 of 205, and at its contacts 2, it grounds the upper winding terminal of switching relay 205.

Stepping magnet 210 now operates in a buzzer-like manner to advance brushes 211 to 216 from home position and over links LK1 to LK25 (Figs. 1 and 2) until an idle link is found. The stepping circuit is from ground encountered by brush 212, through back contact 2 of relay 205, contacts 3 of relay 202, interrupter contacts of 210, and winding of 210, to battery. When an idle link (such as LK1) is reached, test brush 212 finds no guarding ground on conductor S thereof, whereupon magnet 210 ceases to operate. Switching relay 205, which is short-circuited as long as brush 212 encounters ground, now operates in series with magnet 210.

At its contacts 1, switching relay 205 further opens the homing circuit for motor magnet 210; at its contacts 2, it applies ground through brush 212 to conductor S of multiple 1MU to mark link LK1 busy to the selectors PS2 to PS25 of Fig. 1; at its contacts 3 and 4, it extends talking conductors T and R of trunk T1 to the corresponding conductors of link LK1 through brushes 213 and 214; at its contacts 5, it prepares a circuit for answer relay 204; and at its contacts 6, it applies ground through brush 216 to wire M of group 1MU, which is joined to wire S of group PR1, to mark link LK1 as waiting in the bank of preference allotter PRA.

Pilot relay 250, at LP, operates in series with lamp L1 to ground start wire ST1.

With the preference allotter PRA in its illustrated home position, ground on ST1 operates the self-interrupted motor magnet 301, via brush 306 and contacts 2 of relay 302. With all non-home contacts of brush 306, grounded, magnet 301 continues to advance brushes 306 to 308 until shunted by a marking ground encountered by test brush 307. Variable resistor 304 is connected between the battery lead and magnet 301 to enable the magnet to be shunted sufficiently to stop it.

When the marked and waiting link LK1 (represented by conductors PR1) is reached, marking ground on conductor S of PR1 is encountered by brush 307 thereby closing a circuit through contacts 1 of relay 302 and variable resistor 305 to the junction of 301 and 304, thereby effectively shunting magnet 301 to stop the allotter on link LK1. Relay 302 now operates through brush 307, being adjusted so as not to respond to such motor-magnet current as may reach it through 305.

At its contacts 1 and 2, relay 302 opens the motor-magnet circuit; at its contacts 4, it grounds start wire ST2; and at its contacts 3, it grounds brush 308, thereby grounding conductor M in group PR1, which continues as wire S in multiple 2MU. Link LK1 is thereby marked as allotted in the banks of the call finders CF1 to CF5.

The position allotter PA1, although shown in a home position merely for convenience, normally stands on an idle call-finder CF1 to CF5. If it should be in its illustrated home position at a time when idle relay 321 is operated, as from CF1 as described, and if chain relay 322 is then restored by virtue of a position POS2 to POS5 being attended (in addition to POS1), then motor magnet 324 is operated through contacts 1 of relays 321 to 323, to battery through 325.

When idle switch CF1 is reached, brush 327 finds ground on conductor S of group PA1, thereby shunting magnet through resistor 326 to stop its operation, resistors 326 and 325 corresponding to 305 and 304 of PRA. Relay 323 now operates as described for relay 302. Its contacts 1 and 2 disconnects magnet 324, and its contacts 3 extends the start wire ST2 to brush 328 in readiness for the next allotted call waiting on a link LK1 to LK25.

With the first position POS1 thus idle and allotted, the noted grounding of start wire ST2 by relay 302 extends start ground through contacts 2 of the operated idle relay 321, back contact 2 of the unoperated chain relay 322, contacts 3 of the operated relay 323, brush 328, wire M in group PA1, contacts 2 of in-service relay 336, and through contacts 2 of relay 332 to start relay 333. Start relay 333 thereupon operates.

Unless the brushes 340 to 346 are already standing on the currently marked link, as may happen during light traffic conditions, motor magnet 331 advances its brushes 340 to 346 to find the link (LK1) marked by PRA. When the marked link LK1 is found test brush 340 finds ground on conductor S of 2MU, thereby shunting magnet 331 through resistor 338 to stop its operation, resistors 338 and 337 corresponding to 305 and 304 of PRA.

Switching relay 332 now operates as described for relay 302, through contacts 2 of relay 333 and locks itself operated to wire 347. Wire 347 is normally grounded from ground at closed contacts 1 of relay 336, release key RK, and through break contacts of unoperated cut-off relay 335.

At its contacts 2, switching relay 332 restores start relay 333 thereby disconnecting 331 at its contacts 1 and 2; at its back contact 1, it removes idle indicating potential from Idle wire of group PAA, and at its front contact 1, it lights call lamp CL of operators position POS1 to indicate to the attendant a call is waiting; at its back contact 4, it removes idle indicating potential from wire S of group PA1, thereby allowing relay 323 to restore to allow the position allotter PA1 to hunt for an idle attended operators position, and at its front contact 4 ground potential is applied to wire 348. At its contacts 5 and 6, relay 332 extends talking conductors T and R of link LK1 through talking condensers 362 and 363 to the operators talking circuit; and at its contacts 7, it applies ground potential through brush 343 to answer wire A of link LK1 to operate answer relay 204 of selector PS1. The result of the closure of contacts 8 and 9 of relay 332 will hereinafter be described in connection with the transfer feature.

At its contacts 2, answer relay 204 further holds relay 205 operated; at its contacts 3, it further grounds sleeve conductor S of T1; and at its contacts 1, it operates cutoff relay 203.

At its back contacts, the cutoff relay 203 releases start relay 202 and at its front contacts further locks itself operated.

At its contacts 4, start relay 202 upon restoring prepares a circuit to apply idle indicating potential to conductor S of T1; at its contacts 6, it removes trunk-ring-tone from conductor T of T1; at its front contact 1, it extinguishes lamp L1 and restores relay 250 if no calls are waiting; and at its back contact 1, it prepares a homing circuit for 210; and its contacts 5, it removes marking ground from brush 216.

The removal of ground potential from brush 216 removes marking ground from wire M of group 1MU, and wire S of group PR1 thereby restoring relay 302 of PRA. At its contacts 3, relay 302 upon restoring removes marking ground from wire M of group PR1; at its contacts 4 it removes ground from start wire ST2; and at its contacts 1 and 2 completes an operate path for 301.

Motor magnet 301 thereupon operates to advance its brushes in search for the next marked link. If no calls are waiting preference allotter PRA returns to its normal illustrated home position.

When the operator at position POS1 and the subscriber, who requested special service, have completed their transaction, the normal procedure is for the subscriber to replace his handset thereby restoring line relay 201 which restores cutoff relay 203. The operator upon completing the transaction operates a release key RK to restore the special-service apparatus. The operation of RK removes ground from wire 347 thereby restoring relay 332.

At its front contact 1, switching relay 332 extinguishes call lamp CL and at its back contact 1 it reoperates idle relay 321; at its back contact 4, it extends idle indicating ground to the bank of the position allotter over wire S; at its contacts 5 and 6, it opens the talking path; and at its contact 7, it removes ground from wire A, of link LK1 to restore answer relay 204, of preference selector PS1.

At its contacts 3, answer relay 204 removes holding ground from sleeve conductor S, of special service trunk T1 thereby clearing out SS, OS and F1 thereby restoring line relay 201 if the subscriber has not replaced his handset; at its contacts 2, it restores switching relay 205; and at its contacts 1, it removes operating ground from relay 203 but relay 203 remains operated through its front contact until line relay 201 restores.

The cutoff relay 203 remains operated under control of relay 201 to prevent the reoperation of start relay 202 during the homing of the preference-selector switch.

Upon restoring, switching relay 205 disconnects special-service trunk T1 from link LK1, and at its contacts 2, removes busy indicated ground from wire S, of multiple 1MU, and at its contacts 1 completes the homing circuit for motor magnet 210 from ground at back contact 1 of start relay 202, contact 1 of 205, multipled contacts 1 to 25 of the contact bank associated with homing brush 211, brush 211, winding of 210, to battery. Motor magnet 210 advances its brushes 211 to 216 to their illustrated home position H, where brush 211 again applies idle-indicating battery to the sleeve wire S of special-service trunk T1, thereby indicating T1 as idle to the selector SS. The apparatus is then ready to receive a further call.

If position POS1 is the only position attended chain relay 322 is normally operated as previously described. With 322 operated, the operated path for 324 is open and the start ground on wire ST2 is extended directly to wire M of group PA1 thereby CF1 searches and finds all calls waiting on links LK1 to LK25.

*Call-transfer*

If an operator at positions POS1 to POS5 receives a call in a language with which the operator is not familiar she may transfer the call to an idle supervisory position by operating a transfer key which causes the concerned call to appear at idle positions POS6 to POS8. The call is then automatically cleared from the original answering position. Positions POS6 to POS8 are similarly equipped as POS1 to POS5.

If a call being handled at operators position POS1 is to be transferred, the operator operates transfer key TK which operates transfer relay 334, from ground at front contact 4 of operated switching relay 332, wire 348, transfer key TK, winding of 334, to battery.

At its contacts 1, relay 334 locks itself operated to ground on wire 348, under control of the switching relay 332; at its contact 2, it applied ground through brush 345, wire M, which is joined to wire S of multiple 3MU, to mark link LK1 in the bank of call finders CF6 to CF8; at its contacts 3 ground is applied to start wire ST3, being a wire similar to start wire ST2.

Ground on start wire ST3 extended through position allotter PA2 (Fig. 1) to an idle call finder CF6, for example, starts the finder CF6 hunting for the marked link LK1.

When finder CF6 finds the marked link LK1, in the manner as described for CF1, switching relay 332 and in-service relay 336 of CF1 are operated.

At its contacts 9, switching relay 332, associated with call finder CF6, operates cutoff relay 335 of finder CF1.

The operate circuit for relay 335 is from ground at contacts 9 of switching relay 332, of call finder CF6, brush 346 of CF6, wire CG of multiple 3MU, wire CR, brush 344, contacts 8 of relay 332 of CF1, winding of 335, to battery.

At its contacts, cutoff relay 335 removes ground from wire 347 to restore switching relay 332 thereby releasing call finder CF1.

At its contacts 1, switching relay 332 upon restoring applies ground potential to wire Idle of position allotter PA1; at its contacts 4, it restores transfer relay 334; at its contacts 2, it prepares an operate circuit for relay 333; and at its contacts 5 and 6 it opens the talking path to POS1.

It has been chosen to illustrate the call finders CF1 to CF8 as being similar, and it will be readily understood that in call finders CF6 to CF8 their associated transfer relay 334, cutoff relay 335, and the transfer key TK serve no utility.

Contacts 9, of switching relay 332, brush 346, and wire CG of multiple 2MU of call finders CF1 to CF5 are shown, but serve no utility.

The operator at POS6 upon completing the transaction with the subscriber clears out the connection in the manner as described for POS1.

Figure 4:
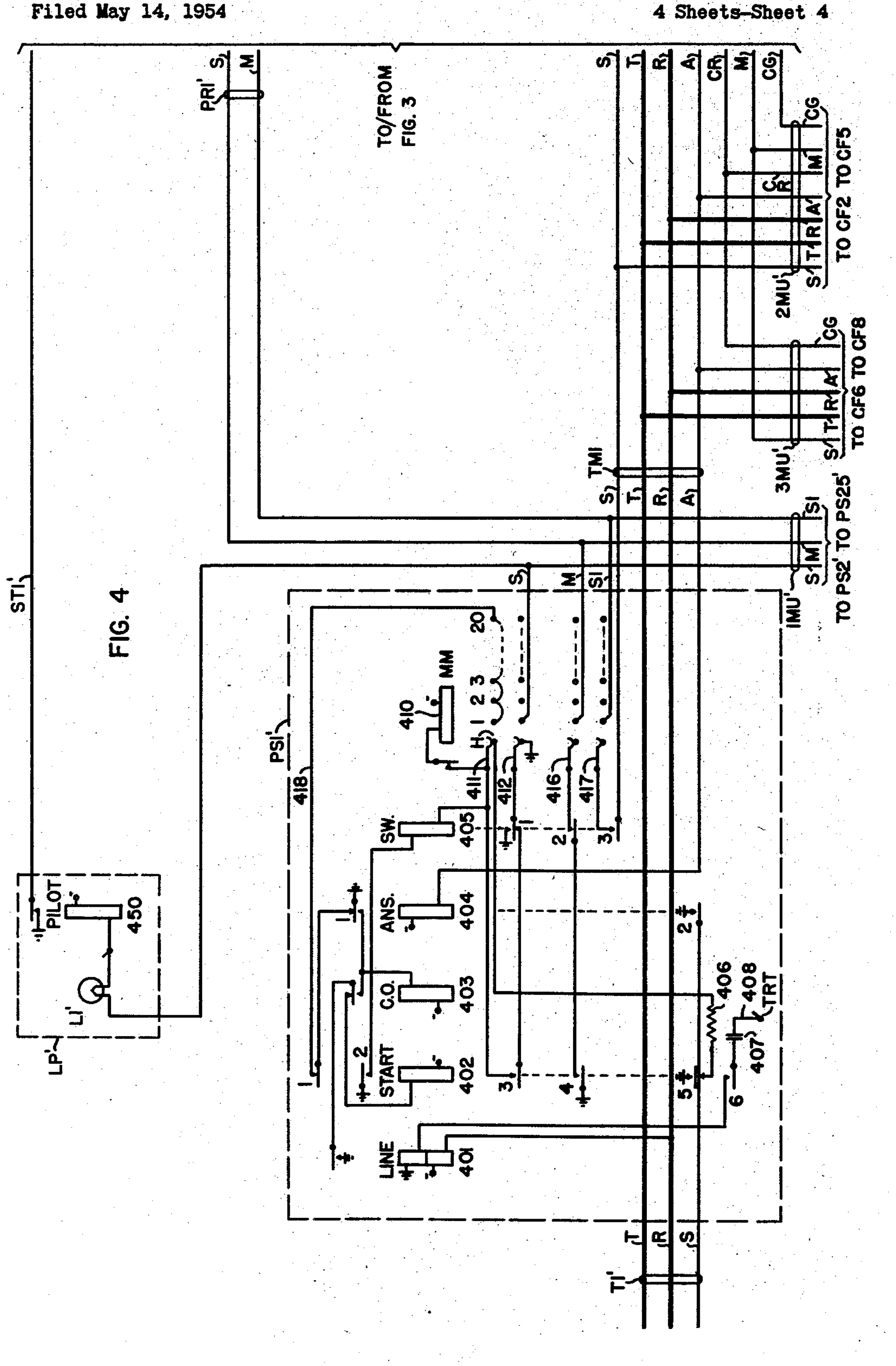
Fig. 4 is a circuit diagram of a modification of Fig. 2.

*Fig. 4—circuit diagram modification*

Preference selector PS1′ of Fig. 4, is a modification of the preference selector PS1 of Fig. 2.

Wires T and R of special-service trunk T1′, instead of being extended by contacts of the switching relay, the preference selector switch, and links LK1 to LK25, are extended directly to the banks of the call finder switches CF1 to CF5 over trunk multiple TM1.

When preference selector PS1′ is not in use and is in its illustrated normal (home) position an idle-indicating potential is applied to sleeve conductor S of trunk T1′ in the manner as described for PS1 of Fig. 2.

When a call arrives on trunk T1′, by seizure of the trunk by a selector SS of Fig. 1, line relay 401 operates over the calling loop and conductors T and R of T1′. It operates start relay 402 through the back contacts of cutoff relay 403. At its contacts 4, start relay 402 prepares to apply marking ground to brush 416; at its contacts 5, it substitutes a holding ground potential on conductor S of T1′ for the normal idle-indicating potential; at its contacts 6, it applies trunk-ring-tone current to wire T of trunk T1′, from source TRT, via wire 208 and condenser 207; at its contacts 1, it disconnects ground from contacts 1 to 25 in the bank of homing brush 411; at its contacts 3, it connects motor magnet 410 to test brush 412 via back contact 1 of 405; and at its contacts 2, it grounds the upper winding terminal of switching relay 405.

Stepping magnet 410 now operates in a manner as described for magnet 210 (Fig. 2) until test brush 412 finds no guarding ground on conductor S thereof, whereupon magnet 410 ceases to operate. Switching relay 405, which is shortcircuited as long as brush 412 encounters ground, now operates in series with magnet 410.

At its contacts 1, switching relay 405 applies ground through brush 412 to conductor S of multiple 1MU′ to mark the preference selector PS1′ as busy, which also operates pilot relay 450 in series with lamp L1′ of lamp panel LP′ thereby grounding start wire ST1′ to start the preference allotter PRA (Fig. 3); at its contacts 2 it applies marking ground through brush 416 to wire M of group 1MU′ which is joined to wire S of group PR1′ to mark TM1 as waiting in the bank of the preference allotter PRA; at its contacts 3 the marking ground extended from allotter PRA over wire M of PR1′, which is joined to wire S1 of 1MU′, brush 417, contacts 3 of relay 405, wire S of trunk multiple TM1 to the call finders CF1 to CF5 of Fig. 3.

An idle call finder, selected by the position allotter, in the manner as described for Fig. 3, finds trunk TM1 and extends the connection to the operator's position and extends ground back over answer wire A of the multiple TM1 to operate the answer relay 404.

At its contacts 1, answer relay 404 operates cutoff relay 403 and further opens the homing path for the switch; and at its contacts 2, it further grounds sleeve wire S of trunk T1′.

At its contacts cutoff relay 403 further locks itself operated and restores start relay 402.

At its contacts 1, start relay 402 upon restoring prepares a homing circuit for a motor magnet 410; at its contacts 4, it removes marking ground from wire S of group PR1′; at its contacts 6, it removes trunk-ring-tone from conductor T of trunk T1′; at its contacts 5, it prepares to apply idle indicating battery to the sleeve conductor S of the T1'; and at its contacts 2, it restores switching relay 405.

Switching relay 405 upon restoring opens the operate circuit for lamp L1' and pilot relay 450 and removes marking ground from conductor S of TM1.

Upon completing the transaction the operator operates her release key in the manner as described (for Figs. 2 and 3) thereby removing ground from the answer wire A of trunk multiple TM1 to restore answer relay 404.

At its contacts 2, answer relay 404 removes ground from the sleeve conductor S of trunk T1'; and at its contacts 1, completes the homing path for motor magnet 410.

Motor magnet 410 advances its brush to its illustrated homing position to apply idle indicating battery to sleeve conductor S.

The cutoff relay 403 remains operated under control of line relay 401 to prevent the reoperation of start relay 402 during the homing of the switch if the subscriber does not replace his handset thereby holding relay 401 operated.

The restoration of line relay 401 restores cutoff relay 403 thereby returning the preference selector PS1' to its normal illustrated position.

It is contemplated that, in the modification shown in Fig. 4, a twenty-point switch will suffice, instead of a twenty-five-point switch as shown for Fig. 2, to handle the same amount of traffic.

The multiples 1MU' to 3MU' are multiples similar to multiples 1MU to 3MU of Fig. 2.

I claim:

1. In a switching system, first-group lines, separate means for each first-group line for placing a calling condition thereon, second group lines, means including circuit means for establishing a series of successive waiting positions for calling first-group lines, preference-selecting means responsive to a calling condition being placed on any first-group line for selecting the first idle waiting position in the series and for assigning that position to the calling first-group line, whereby successive ones of the waiting positions are assigned respectively to calling first-group lines in the order in which such lines are placed in calling condition, a preference allotter and means for operating it into association with assigned waiting positions in succession in the order of their assignment to respective first-group lines, switching means, and means controlled by the preference allotter when in association with any assigned waiting position for operating a portion of the switching means to connect an idle second-group line to the waiting first-group line which has been assigned to such waiting position, the preference-selecting means comprising a separate preference selector for each first-group line, each preference selector having positions corresponding respectively to the established waiting positions, each preference selector having means for operating it into its positions in succession responsive to a calling condition on its associated first-group line and for seizing the first idle position encountered, means responsive to the said seizure for marking busy the corresponding position of each other preference selector and for marking the corresponding waiting position as occupied by a first-group line in calling condition.

2. In a switching system according to claim 1, each preference selector comprising a multi-brush stepping switch having successive sets of bank contacts comprising its positions, with means for advancing its brushes onto the contact sets in succession during a selecting operation, and means for causing the brushes to stand normally in a home position in fixed reference to the first set of bank contacts.

3. In a switching system, first-group lines, separate means for each first-group line for placing a calling condition thereon, second-group lines, means including circuit means for establishing a series of successive waiting positions for calling first-group lines, preference-selecting means responsive to a calling condition being placed on any first-group line for selecting the first idle waiting position in the series and for assigning that position to the calling first-group line, whereby successive ones of the waiting positions are assigned respectively to calling first-group lines in the order in which such lines are placed in calling condition, a preference allotter and means for operating it into association with assigned waiting positions in succession in the order of their assignment to respective first-group lines, switching means, and means controlled by the preference allotter when in association with any assigned waiting position for operating a portion of the switching means to connect an idle second-group line to the waiting first-group line which has been assigned to such waiting position, a position allotter and means for advancing it over the second-group lines in succession cyclically, means for causing the position allotter to stop at and allot any idle second-group line encountered, means for causing the switching means to connect to a waiting first-group line only an idle second-group line which is then allotted by the allotting means, and means responsive to an allotted second-group line becoming connected to a first-group line for marking that second-group line busy to the position allotter.

4. In a switching system, first-group lines, separate means for each first-group line for placing a calling condition thereon, second-group lines, means including circuit means for establishing a series of successive waiting positions for calling first-group lines, preference-selecting means responsive to a calling condition being placed on any first-group line for selecting the first idle waiting position in the series and for assigning that position to the calling first-group line, whereby successive ones of the waiting positions are assigned respectively to calling first-group lines in the order in which such lines are placed in calling condition, a preference allotter and means for operating it into association with assigned waiting positions in succession in the order of their assignment to respective first-group lines, switching means, and means controlled by the preference allotter when in association with any assigned waiting position for operating a portion of the switching means to connect an idle second-group line to the waiting first-group line which has been assigned to such waiting position, wherein the said first-group lines comprise a group of special-service trunks to which respective connections are made through an automatic telephone switchboard, the said calling condition on any first-group line being dependent on the existence of said switchboard connection thereto, each first-group line including relay means responsive to its calling condition to control the preference selecting means and to place a holding condition on the line to hold the associated switchboard connection, means at each first-group line controlled from any second-group line with which it becomes connected for establishing and for subsequently terminating an answered condition at the first-group line, and means including locking means responsive to the said termination of the answered condition at any first-group line for terminating the said holding condition thereon to permit the switchboard connection to clear out and thereby free the trung comprising the last said first-group line.

5. In a switching system, first-group lines, separate means for each first-group line for placing a calling condition thereon, second-group lines, means including circuit means for establishing a series of successive waiting positions for calling first-group lines, preference-selecting means responsive to a calling condition being placed on any first-group line for selecting the first idle waiting position in the series and for assigning that position to the calling first-group line, whereby successive ones of the waiting positions are assigned respectively to calling first-group lines in the order in which such lines are placed in calling condition, a preference allotter and means for operating it into association with assigned waiting positions in succession in the order of their assignment to respective first-group lines, switching means, and means controlled by the preference allotter when in association with any assigned waiting position for operating a portion of the switching means to connect an idle second-group line to the waiting first-group line which has been assigned to such waiting position, third-group lines, each second-group line including transfer means, means responsive to an operation of the transfer means of a second-group line in connection with a calling first-group line for applying a marking condition in reference to the connected first-group line, second switching means, means controlled by the said marking condition for operating a portion of the second switching means to connect an idle third-group line to the last said first-group line, and means responsive thereto for freeing the last said second-group line while leaving the last said first-group and third-group lines connected together.

6. In a switching system, first-group lines, separate means for each first-group line for placing a calling condition thereon, second-group lines, means including circuit means for establishing a series of successive waiting positions for calling first-group lines, preference-selecting means responsive to a calling condition being placed on any first-group line for selecting the first idle waiting position in the series and for assigning that position to the calling first-group line, whereby successive ones of the waiting positions are assigned respectively to calling first-group lines in the order in which such lines are placed in calling condition, a preference allotter and means for operating it into association with assigned waiting positions in succession in the order of their assignment to respective first-group lines, switching means, and means controlled by the preference allotter when in association with any assigned waiting position for operating a portion of the switching means to connect an idle second-group line to the waiting first-group line which has been assigned to such waiting position, links corresponding respectively to the established waiting positions, the means for selecting an idle waiting position comprising means for seizing the corresponding link and for connecting the concerned calling first-group line thereto, and the switching means comprising means for connecting an idle second-group line to the link associated with any waiting position with which the preference-allotting means is currently associated, whereby the second-group line is connected to the concerned first-group line through the last said link.

7. In a switching system according to claim 6, wherein the means for assigning a selected idle waiting position to a calling first-group line includes means for marking the assigned waiting position busy to the preference-selecting means and includes means for marking the assigned waiting position as assigned to the preference allotter, means responsive to the switching means connecting an idle second-group line to a link to which a waiting first-group line is connected for marking the corresponding waiting position as unassigned to the preference allotter while maintaining it marked busy to the preference selecting means, means for subsequently disconnecting any connected link from the connected first-group and second-group lines, and means responsive to the disconnection of the link from the connected first-group line for marking the corresponding waiting position idle to the preference-selecting means.

8. In a switching system, first-group lines, separate means for each first-group line for placing a calling condition thereon, second-group lines, means including circuit means for establishing a series of successive waiting positions for calling first-group lines, preference-selecting means responsive to a calling condition being placed on any first-group line for selecting the first idle waiting position in the series and for assigning that position to the calling first-group line, whereby successive ones of the waiting positions are assigned respectively to calling first-group lines in the order in which such lines are placed in calling condition, a preference allotter and means for operating it into association with assigned waiting positions in succession in the order of their assignment to respective first-group lines, switching means, and means controlled by the preference allotter when in association with any assigned waiting position for operating a portion of the switching means to connect an idle second-group line to the waiting first-group line which has been assigned to such waiting position, the preference selecting means comprising stepping switches individual respectively to the first-group lines, the preference allotter comprising a stepping switch, and the said switching means comprising stepping switches individual respectively to the second-group lines, each of said stepping switches having bank-contact positions corresponding respectively to the waiting positions.

9. In a switching system, first-group lines, separate means for each first-group line for placing a calling condition thereon, second-group lines, means including circuit means for establishing a series of successive waiting positions for calling first-group lines, preference-selecting means responsive to a calling condition being placed on any first-group line for selecting the first idle waiting position in the series and for assigning that position to the calling first-group line, whereby successive ones of the waiting positions are assigned respectively to calling first-group lines in the order in which such lines are placed in calling condition, a preference allotter and means for operating it into association with assigned waiting positions in succession in the order of their assignment to respective first-group lines, switching means, and means controlled by the preference allotter when in association with any assigned waiting position for operating a portion of the switching means to connect an idle second-group line to the waiting first-group line which has been assigned to such waiting position, the preference selecting means comprising first stepping switches individual respectively to the first-group lines, the preference allotter comprising a second stepping switch, and the said switching means comprising third stepping switches individual respectively to the second-group lines, each of the said first and second stepping switches having bank-contact positions corresponding respectively to the waiting positions, and each of the said third stepping switches having bank-contact positions corresponding respectively to the first-group lines.

10. In a switching system according to claim 1, each first-group line and each waiting position including a separate marking conductor, the preference selecting means including means for connecting the marking conductor of any assigned first-group line to the marking conductor of the waiting position assigned thereto, the preference allotter including means for energizing the marking conductor of any assigned waiting position with which it is associated, thereby energizing the marking conductor of the first-group line to which the waiting position is assigned to mark such line as allotted, the said means controlled by the preference allotter comprising means responsive to the said energization of the marking conductor of the allotted first-group line for operating a portion of the switching means to connect an idle second-group line to the allotted first-group line.

References Cited in the file of this patent

UNITED STATES PATENTS

| | | |
|---|---|---|
| 1,816,634 | Carpenter et al. | July 28, 1931 |
| 2,155,933 | De Vriendt et al. | Apr. 15, 1939 |